United States Patent
Nakajima et al.

(10) Patent No.: US 7,636,109 B2
(45) Date of Patent: Dec. 22, 2009

(54) DIGITAL CAMERA

(75) Inventors: Kenichi Nakajima, Kanagawa (JP); Junzou Sakurai, Tokyo (JP)

(73) Assignee: Eastman Kodak Company, Rochester, NY (US)

( * ) Notice: Subject to any disclaimer, the term of this patent is extended or adjusted under 35 U.S.C. 154(b) by 544 days.

(21) Appl. No.: 11/257,563

(22) Filed: Oct. 25, 2005

(65) Prior Publication Data

US 2006/0221192 A1    Oct. 5, 2006

(30) Foreign Application Priority Data

Mar. 31, 2005    (JP) .............................. 2005-101568

(51) Int. Cl.
*H04N 9/73* (2006.01)
*H04N 5/335* (2006.01)

(52) U.S. Cl. .................................. 348/226.1; 348/322

(58) Field of Classification Search .............. 348/223.1, 348/226.1, 281, 294, 332.1, 227.1, 228.1
See application file for complete search history.

(56) References Cited

U.S. PATENT DOCUMENTS

| | | | |
|---|---|---|---|
| 6,295,085 B1 * | 9/2001 | Munson et al. | 348/226.1 |
| 6,501,518 B2 * | 12/2002 | Smith et al. | 348/425.3 |
| 6,630,953 B1 * | 10/2003 | Toyoda et al. | 348/226.1 |
| 6,710,818 B1 * | 3/2004 | Kasahara et al. | 348/607 |
| 7,280,135 B2 * | 10/2007 | Kim | 348/228.1 |
| 2003/0112343 A1 * | 6/2003 | Katoh et al. | 348/226.1 |
| 2004/0051791 A1 * | 3/2004 | Hashimoto | 348/226.1 |
| 2004/0165084 A1 * | 8/2004 | Yamamoto et al. | 348/226.1 |
| 2004/0179114 A1 * | 9/2004 | Silsby et al. | 348/226.1 |
| 2005/0046704 A1 * | 3/2005 | Kinoshita | 348/226.1 |
| 2005/0200704 A1 * | 9/2005 | Kodake et al. | 348/207.99 |
| 2005/0238259 A1 * | 10/2005 | Kim et al. | 382/312 |
| 2006/0158531 A1 * | 7/2006 | Yanof | 348/226.1 |

FOREIGN PATENT DOCUMENTS

| | | |
|---|---|---|
| JP | 2002152604 | 5/2002 |
| JP | 2004153710 | 5/2004 |

* cited by examiner

*Primary Examiner*—Nhan T Tran
*Assistant Examiner*—Trung Diep
(74) *Attorney, Agent, or Firm*—Peyton C. Watkins; Pamela R. Crocker

(57) ABSTRACT

A digital camera capable of accurately detecting flicker even while a video image is displayed on a display device is provided. In a digital camera, a video image is displayed on a display device 40 serving as a viewfinder for photographing based on a display video signal supplied from a CMOS image sensor 120 while image data based on a recording video signal supplied from the CMOS image sensor 120 is recorded in a recording unit 50. The digital camera detects flicker based on a video signal supplied from a group of pixel circuits which do not supply the display video signal among the group of pixel circuits forming the CMOS image sensor 120.

12 Claims, 13 Drawing Sheets

DIGITAL CAMERA

FIELD OF THE INVENTION

The present invention relates to digital cameras, such as an electronic still camera and a video camera.

BACKGROUND OF THE INVENTION

Common fluorescent lights flashing with a commercial AC power source repeatedly blink at a cycle of $\frac{1}{100}^{th}$ of a second and $\frac{1}{120}^{th}$ of a second when the frequency of the power source is 50 Hz and 60 Hz, respectively. When such incident light is converted into an electrical signal and read by an image pickup device, an exposure initiation time is varied with the position of the readout pixel when an image pickup tube or a MOS type solid-state image sensing device is used, as a result of which the total sum of the amount of light entering within the exposure time of each pixel is varied even in the same frame. As a result, a single frame has a bright portion and a dark portion at the cycle of $\frac{1}{100}^{th}$ of a second or $\frac{1}{120}^{th}$ of a second, and such a phenomenon is called flicker.

Japanese Patent Laid-Open Publication No. 2002-152604 discloses a flicker removal device for extracting a luminance component from a video signal output from a solid-state image sensing device, and detecting flicker based on the extracted luminance component, thereby controlling the exposure time of the solid-state image sensing device based on a result of detection.

Japanese Patent Laid-Open Publication No. 2004-153710 discloses an imaging device for performing control in the following manner in order to speed up initial correction control, such as exposure and white balance control. That is, the imaging device rapidly reads out image data capable of forming one field from a CCD as two items of divided image data, and uses one of the divided image data items to perform initial correction control of, for example, exposure in accordance with the imaging condition. It also produces image data for one field using two divided image data items to display an image on a viewfinder.

The luminance level of a fluorescent light whose power source frequency is 50 Hz, for example, indicates repetitive blinking at a cycle of $\frac{1}{100}^{th}$ of a second as described above. Accordingly, when the exposure period of the solid-state image sensing device is set at $\frac{1}{100}^{th}$ of a second or an integral multiple thereof, the luminance level of the video signal read out at that timing is averaged, wand so flicker may not be detected.

In the imaging device disclosed in Patent Document 2, however, the exposure period for the divided image data items is preferably the exposure period appropriate for displaying an image on a viewfinder. Consequently, when flicker is detected by the flicker detection means disclosed in Patent Document 2 based on the divided image data items used for displaying an image on a viewfinder, flicker of a desired light source may not be detected.

SUMMARY OF INVENTION

The present invention aims to provide a digital camera capable of accurately detecting flicker even during a period when a video image is displayed on a display device.

A digital camera according to the present invention is a digital camera including an XY addressing image sensor having a first group of pixel circuits and a second group of pixel circuits for displaying on a display device a video image based on a display video signal output from the first group of pixel circuits, and recording in a recording device image data based on a recording video signal output from the first and second groups of pixel circuits, comprising a flicker detection circuit for detecting flicker of a light source illuminating an object based on a flicker detection video signal output from the second group of pixel circuits while the first group of pixel circuits output the display video signal, wherein a first vertical synchronization signal utilized when the first group of pixel circuits output the display video signal and a second vertical synchronization signal utilized when the second group of pixel circuits output the flicker detection video signal are mutually asynchronous, and a cycle of the second vertical synchronization signal is determined in accordance with a cycle of fluctuation in luminance level of a light source assumed as the light source of the object.

According to the present invention, the cycle of the second vertical synchronization signal is determined in accordance with the cycle of fluctuation in luminance level of the light source assumed as the light source of the object, and based on the second vertical synchronization signal the flicker detection circuit detects flicker of the light source illuminating the object. As a result, flicker of the light source can accurately be detected even while a video image is displayed on the display device.

According to one embodiment of a digital camera according to the present invention, the XY addressing image sensor includes a first vertical scanning circuit for controlling output of a video signal from the first group of pixel circuits, a second vertical scanning circuit for controlling output of a video signal from the second group of pixel circuits, and a horizontal scanning circuit for outputting the video signals output from the first and second vertical scanning circuits from different output terminals. The cycle of the second vertical synchronization signal is determined individually for a light source having a different cycle of fluctuation in luminance level, and the second vertical scanning circuit controls output of the video signal from the second group of pixel circuits by successively switching the cycle of the second vertical synchronization signal in accordance with the determined cycle.

According to the present invention, the video signal is output from the second group of pixel circuits while the cycle of the second vertical synchronization signal is successively switched in accordance with the determined cycle, and based on the video signal output in the different cycle the flicker detection circuit successively detects flicker of the light source. Consequently, even when a plurality of light sources having different cycles of fluctuation in luminance level are present in the light source assumed as the light source of the object, flicker of the light source can accurately be detected.

According to another embodiment of a digital camera according to the present invention, the second vertical scanning circuit controls so that, for each determined second vertical synchronization signal, the pixel circuits individually output the video signal in the determined cycle, and the horizontal scanning circuit has output terminals each provided corresponding to each determined second vertical synchronization signal, and outputs the video signal output through the second vertical scanning circuit from the output terminals each provided corresponding to each second vertical synchronization signal.

According to the present invention, for each second vertical synchronization signal having a different cycle, the pixel circuits individually output the video signal in a successive manner, and the flicker detection circuit detects flicker of the light source based on such a video signal. As a result, even when a plurality of light sources having different cycles of fluctuation in luminance level are present in the light source assumed as the light source of the object, flicker of the light source can be accurately detected.

According to a further embodiment of a digital camera according to the present invention, a display exposure period for the display video signal output from the first group of pixel circuits and a flicker detection exposure period for the flicker detection video signal output from the second group of pixel circuits are different from each other, and the flicker detection exposure period is a period determined in accordance with the cycle of fluctuation in luminance level of the light source assumed as the light source of the object.

According to the present invention, the flicker detection exposure period is determined in accordance with the cycle of fluctuation in luminance level of the light source assumed as the light source of the object independently from the display exposure period for the display video signal. Consequently, the flicker detection circuit can accurately detect flicker of the light source based on the flicker detection video signal without depending on the display exposure period for the display video signal.

According to the present invention, a display gain for the display video signal output from the first group of pixel circuits and a flicker detection gain for the flicker detection video signal output from the second group of pixel circuits are different from each other, and the flicker detection gain exceeds the display gain.

According to the present invention, the flicker detection gain can be set at an appropriate value without depending on the display gain for the display video signal even when the flicker detection exposure period is set shorter for flicker detection than the display exposure period.

DETAILED DESCRIPTION OF THE INVENTION

Preferred embodiments of the present invention (hereinafter referred to as "embodiments") will be described with reference to the accompanying drawings.

Figure 1:
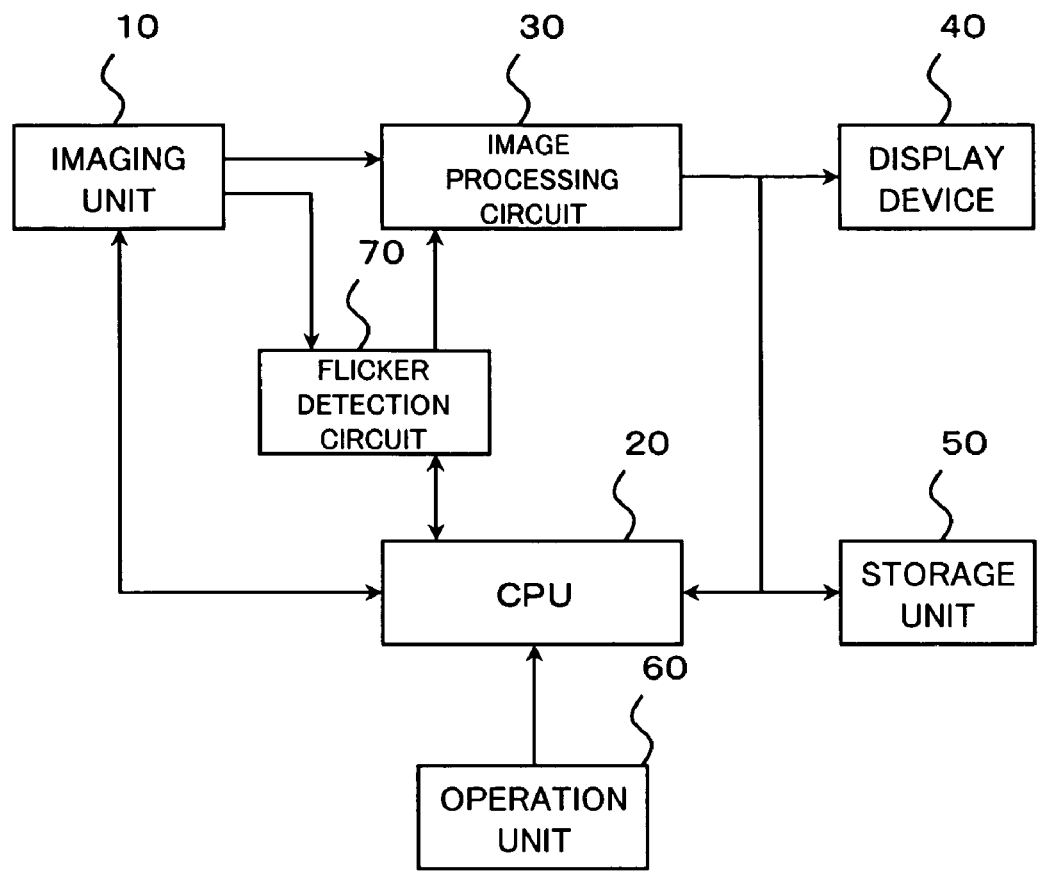
FIG. 1 shows functional blocks of a digital camera according to an embodiment of the present invention.

FIG. 1 is a functional block diagram of a digital camera according to the present embodiment. An imaging unit 10 receives light from an object under the control of a CPU 20, and supplies a video signal in accordance with the received light. The CPU 20 is a central processing unit controlling the entire digital camera for performing arithmetic operations for each circuit, controlling these circuits, and the like. An image processing circuit 30 performs predetermined image processing, such as white balance adjustment, on a video signal, and provides the resulting image data. A display device 40 sequentially displays a video image based on the image data to function as a viewfinder for photographing. A storage unit 50 records image data. An operation unit 60 is a user interface for a user to operate the digital camera when he/she takes a still image or a moving image using the digital camera. A flicker detection circuit 70 detects flicker of a light source, such as a fluorescent light, having a cyclically fluctuating luminance level.

According to the present embodiment, the image processing circuit 30 estimates the light source illuminating the object using a result of flicker detection by the flicker detection circuit 70, and adjusts the white balance in accordance with the detection result.

Figure 2:
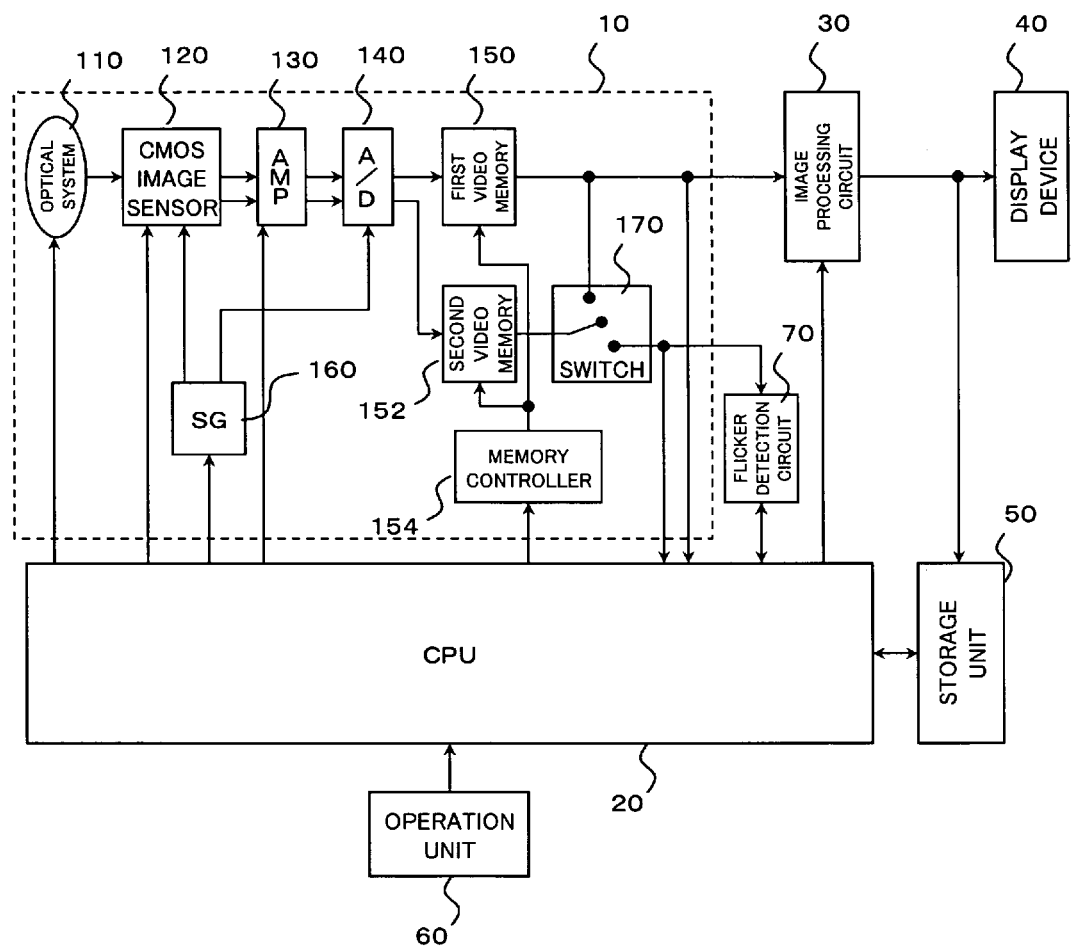
FIG. 2 shows in detail functional blocks of an imaging unit in the digital camera according to the embodiment of the present invention.

Next, the imaging unit 10 will be more specifically described. FIG. 2 more specifically shows functional blocks of the imaging unit 10 of the digital camera. An optical system 110 includes a lens and an aperture diaphragm for allowing light from the object to enter a CMOS image sensor 120 so that a desired video signal is obtained. The CMOS image sensor 120 includes a plurality of pixel circuits and the like for performing photoelectric conversion on light received by each pixel circuit, and supplying a video signal. The CMOS image sensor 120 is an image sensor of an XY addressing type capable of controlling an output of the video signal for each pixel circuit regardless of pixel circuit arrangement. Further, according to the present embodiment, the CMOS image sensor 120 includes two output terminals for the video signal. When a video image is displayed on the display device 40, one of the output terminals supplies a display video signal used for displaying the video image on the display device 40, and the other supplies a flicker detection video signal used by the flicker detection circuit 70 to perform flicker detection. When a still image is taken, each output terminal supplies a recording video signal. A gain control amplifier (AMP) 130 adjusts gain of each video signal. An analog/digital conversion circuit (A/D) 140 converts each video signal supplied from the AMP 130 to a digital signal. A signal generator (SG) 160 generates a signal for synchronization between the CPU 20 and the CMOS image sensor 120, between the CPU 20 and the AMP 130, and between the CPU 20 and the A/D 140.

A first video memory 150 temporarily holds the display or recording video signal supplied from the A/D 140. A second video memory 152 temporarily holds the flicker detection or recording video signal supplied from the A/D 140. A memory controller 154 controls output of each video signal held in the first and second video memories 150 and 152. A switch 170 switches whether to supply the flicker detection video signal held in the second video memory 152 to the flicker detection circuit 70 or to supply the recording video signal to the image processing circuit 30.

When a video image is displayed on the display device 40, the display video signal supplied from the first video memory 150 is input to the image processing circuit 30, and the flicker detection video signal supplied from the second video memory 152 is input to the flicker detection circuit 70. The image processing circuit 30 performs predetermined image processing on the display video signal, and supplies the resulting data to the display device 40. When a still image is taken, the image processing circuit 30 performs predetermined image processing on each recording video signal supplied from the first and second video memories 150 and 152, and produces image data for the still image.

The flicker detection circuit 70 detects flicker based on the flicker detection video signal, and supplies the detection result to the CPU 20. The CPU 20 supplies the detection result to the image processing circuit 30, which in turn estimates a light source illuminating an object using the detection result, and performs white balance adjustment of the input video signal.

Figure 3:
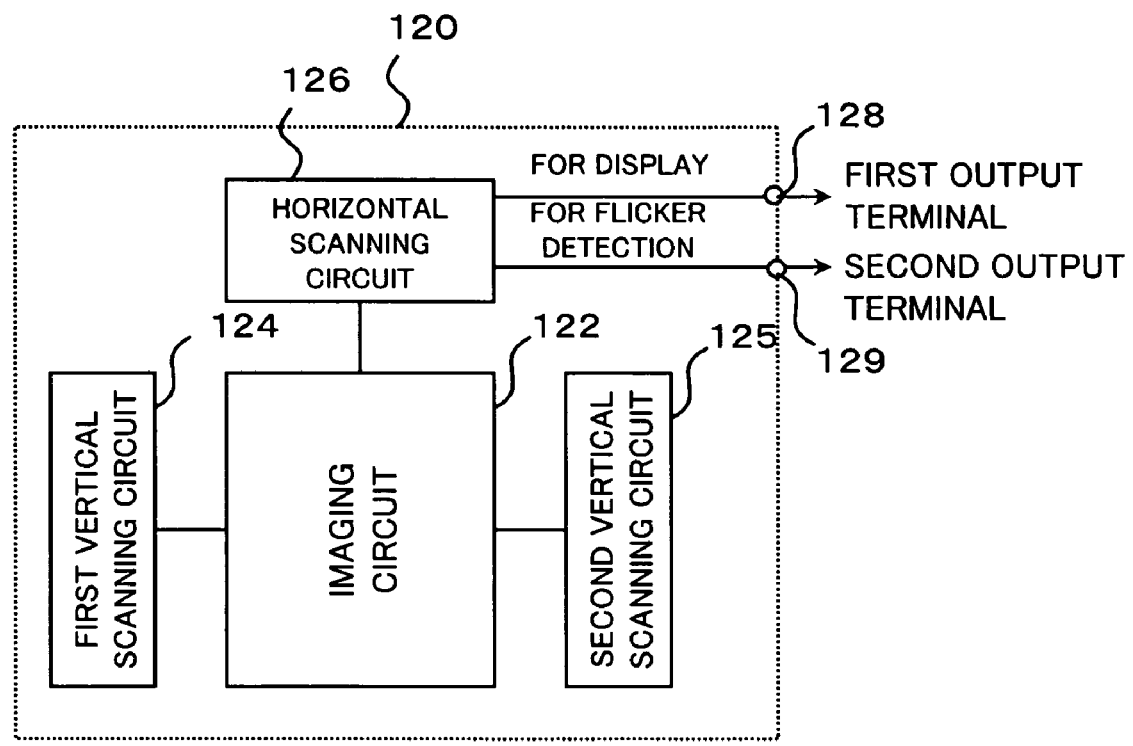
FIG. 3 schematically shows a circuit configuration of a CMOS image sensor according to the embodiment of the present invention.

Operation of the CMOS image sensor 120 will next be described in further detail. FIG. 3 schematically shows a circuit configuration of the CMOS image sensor 120. An imaging circuit 122 includes a plurality of pixel circuits 200. The video signal is produced through photoelectric conversion of light received in each pixel circuit 200. A first vertical scanning circuit 124 transfers to a horizontal scanning circuit 126 the video signal supplied from each pixel circuit assigned for video image display on the display device 40 among a group of pixel circuits forming the imaging circuit 122. A second vertical scanning circuit 125 transfers to the horizontal scanning circuit 126 the video signal supplied from each pixel circuit assigned for flicker detection in the flicker detection circuit 70 among the group of pixel circuits forming the imaging circuit 122. The horizontal scanning circuit 126 supplies the video signal transferred from the first vertical scanning circuit 124 from a first output terminal 128, and supplies the video signal transferred from the second vertical scanning circuit 125 from a second output terminal 129.

Figure 4:
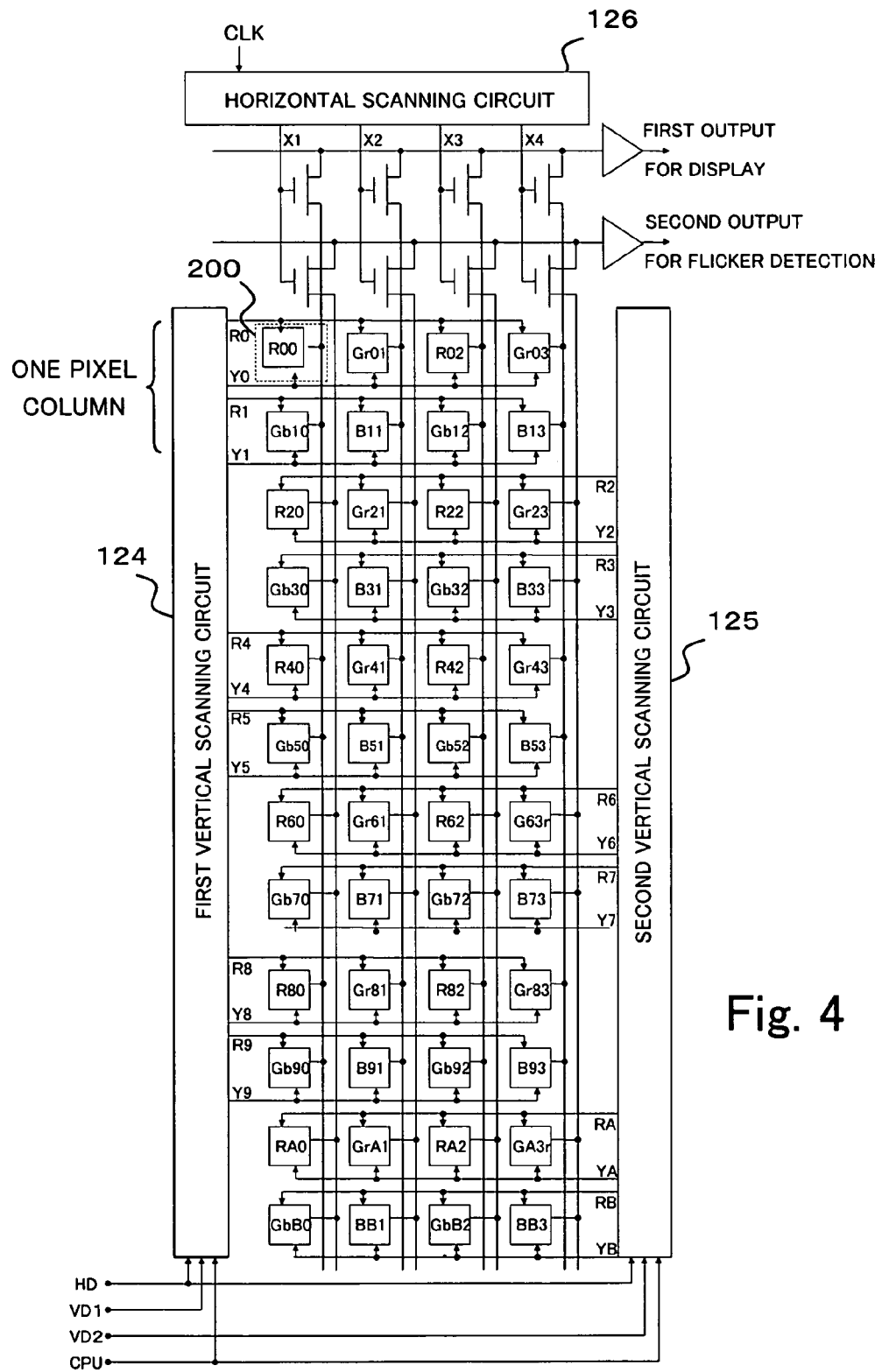
FIG. 4 shows in detail the circuit configuration of the CMOS image sensor according to the embodiment of the present invention.

FIG. 4 shows in detail the circuit configuration of the CMOS image sensor 120. As illustrated in FIG. 4, the pixel circuits 200 forming the imaging circuit 122 are arranged in a lattice pattern, and a total of four imaging circuits 200, i.e. two circuits in a horizontal direction (from right to left in the figure) and two in a vertical direction (from top to bottom in the figure), form a pixel as a unit. Assuming that two rows of pixel circuits in the vertical direction form one pixel column, the pixel columns of the pixel circuits 200 are alternately connected to the first and second vertical scanning circuits 124 and 125. Each video signal supplied from each pixel circuit 200 connected to the first vertical scanning circuit 124 is output from the first output terminal 128 through the horizontal scanning circuit 126. On the other hand, each video signal supplied from each pixel circuit 200 connected to the second vertical scanning circuit 125 is output from the second output terminal 129 through the horizontal scanning circuit 126. Signals HD, VD1, VD2, and CPU in FIG. 4 are instruction signals output from the CPU 20. The signal HD is a horizontal synchronization signal for the horizontal scanning circuit 126, the signal VD1 is a vertical synchronization signal for the first vertical scanning circuit 124, and the signal VD2 is a vertical synchronization signal for the second vertical scanning circuit 125. The signal CPU is a reset signal or a selection signal for each pixel circuit. The reset and selection signals will be described later. Note that assignment of the group of pixel circuits connected to each vertical scanning circuit illustrated in FIG. 4 is illustrative only. For example, the group of pixel circuits may be alternately connected to each vertical scanning circuit with the pixel column being composed of two columns of pixels as a unit.

Figure 5:
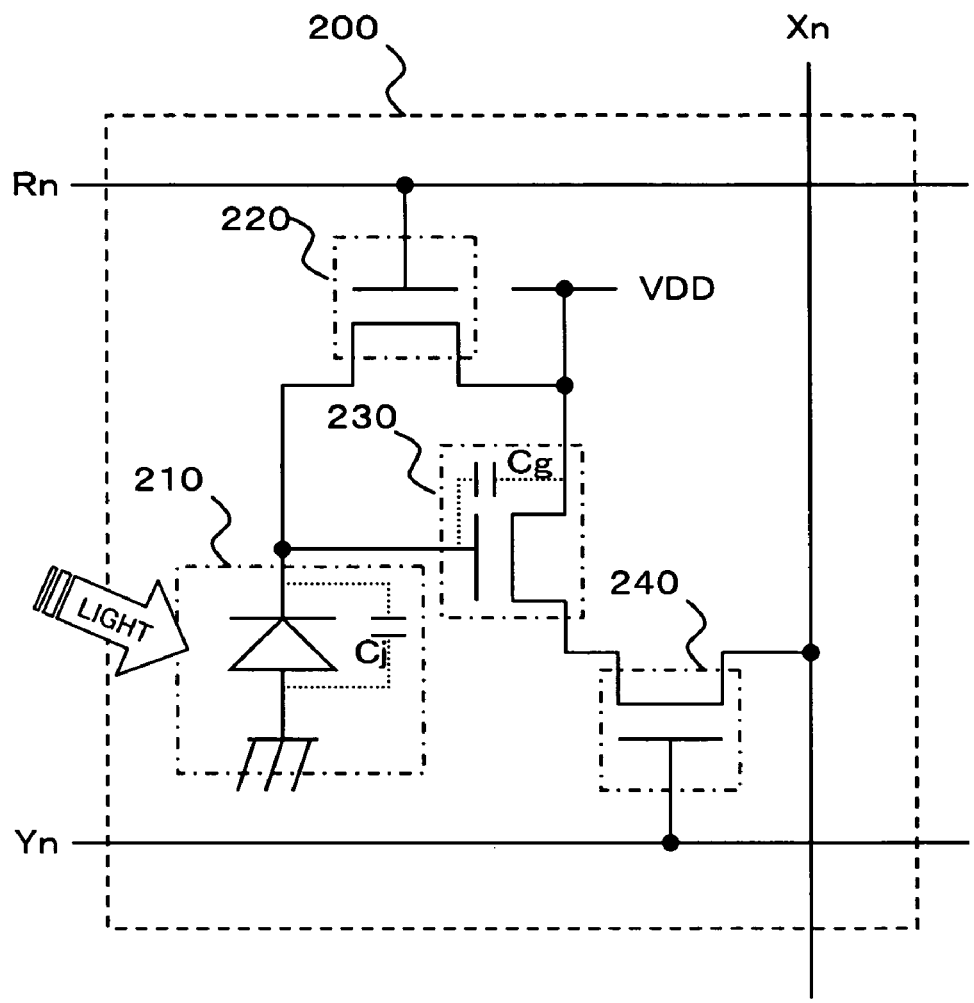
FIG. 5 shows in detail a circuit configuration of a pixel circuit forming part of the CMOS image sensor according to the embodiment of the present invention.

FIG. 5 shows in detail the circuit configuration of each pixel circuit 200 forming the imaging circuit 122. As illustrated in FIG. 5, a cathode side terminal of a photodiode 210 is connected to a voltage power source VDD through a reset switch 220, and to a gate terminal of an amplifying transistor 230. An output terminal of the amplifying transistor 230 is connected through a selection switch 240 to a signal output line Xn.

The pixel configured as described above operates in the following manner. The reset signal is applied to a gate electrode of the reset switch 220 through a reset signal line Rn to turn on the reset switch 220, thereby fixing a voltage of the photodiode 210 on the cathode side to a voltage VDD. Thereafter, when the reset switch 220 turns off, the photodiode 210 starts accumulation of photo charges. The potential of the photodiode 210 on the cathode side changes in accordance with such photo charge accumulation. The amount of change $\Delta V$ can be expressed by the following equation (1):

$$\Delta V = Qph/(Cj+Cg) \qquad (1)$$

wherein Qph denotes the accumulated charges, Cj denotes the junction capacitance of the photodiode 210, and Cg denotes the gate capacitance of the amplifying transistor 230.

After the charge accumulation period, the selection signal is applied to the gate electrode of the selection switch 240 through a selection signal line Yn to turn on the selection switch 240, and the video signal is supplied to the signal output line Xn. A current Iout of the video signal flowing at this moment depends on the amount $\Delta V$, and an amount of change $\Delta I$ approximately satisfies the following equation (2):

$$\Delta Iout = gm^* \times \Delta V \qquad (2)$$

wherein gm* denotes a voltage-current conversion gain of an electric charge reading circuit including an ON resistance Ron of the selection switch 240 and the gain of the amplifying transistor 230, and is in the range of, for example, $1\times10^{-3}$ (A/V) to $1\times10^{-4}$ (A/V).

As described above, between the time when the reset switch 220 is turned on/off by the reset signal and the time when the selection switch 240 is turned on by the selection signal, the photodiode 210 accumulates the photo charges, and a current Iout corresponding to the amount of the charges is supplied. In other words, the pixel circuit 200 supplies the video signal in accordance with the amount of light received during an exposure period, which is between the turn-off of the reset switch 220 and the turn-on of the selection switch 240.

Operation of the CMOS image sensor 120 upon display and flicker detection will next be described.

Figure 6:
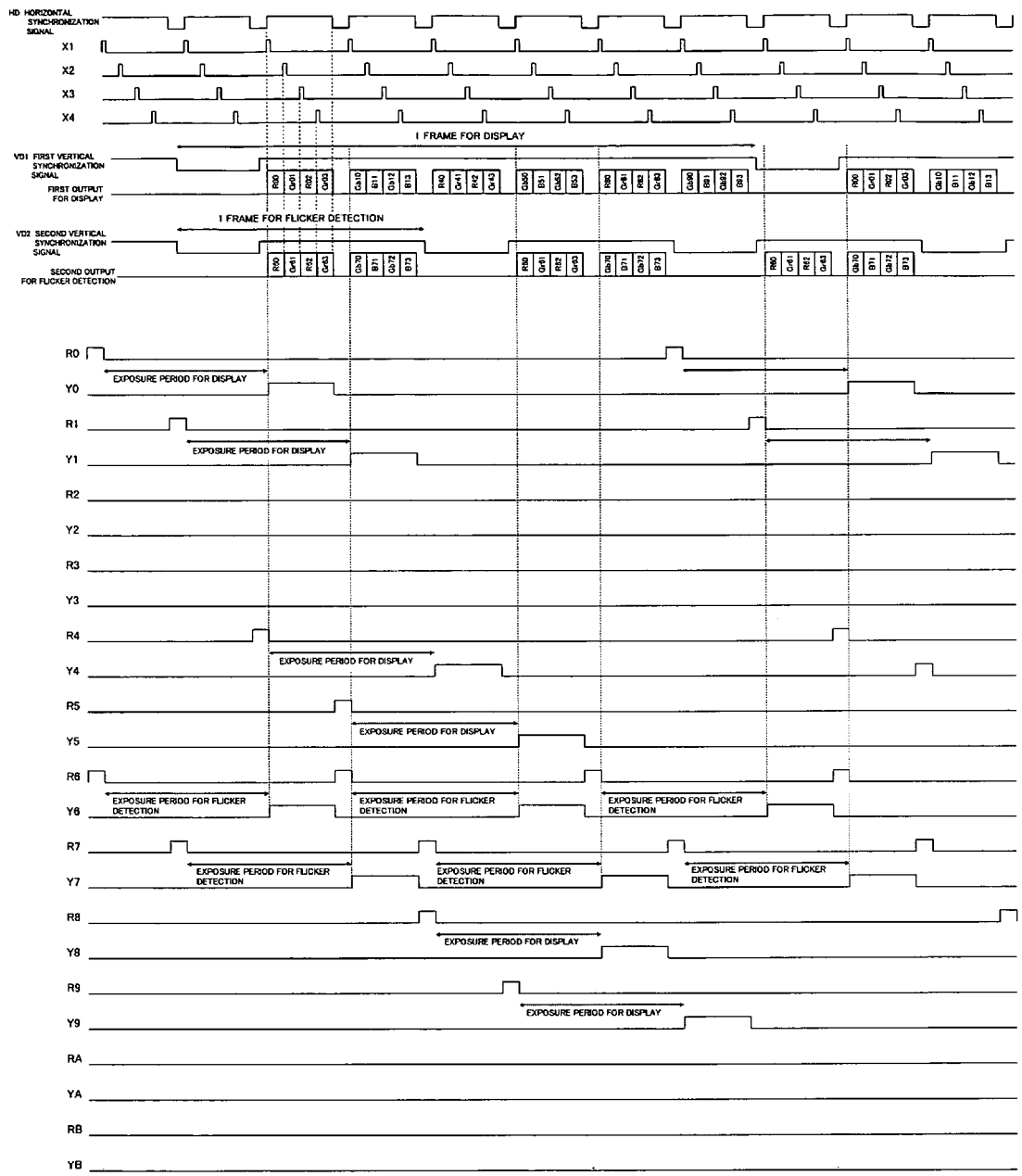
FIG. 6 shows an example of operation timing of a variety of signals supplied to the CMOS image sensor upon flicker detection.

FIG. 6 shows an example of a timing chart of signals input to the CMOS image sensor 120. The pixel circuit 200 accepts reset signal input from the connected vertical scanning circuit through the reset signal line Rn. Further, after a predetermined exposure period is elapsed, the selection signal is supplied to the pixel circuit 200 through the selection signal line Yn.

In accordance with the timing of each vertical synchronization signal (VD1, VD2), the video signal is supplied from each pixel circuit 200 through each vertical scanning circuit 124, 125, while in accordance with the timing of the horizontal synchronization signal (HD), the video signal is output from the corresponding output terminal 128, 129 through the horizontal scanning circuit 126.

The cycles of the first and second vertical synchronization signals correspond to each interval for reading out the video signal for one frame from the pixel circuit, i.e. a sampling frequency during sampling of the video signal for one frame output from the pixel circuit. The sampling frequency for the second vertical scanning circuit 125 (hereinafter referred to as a "second sampling frequency") is preferably set taking into consideration a fluctuation cycle of a luminance level of a light source for which flicker is to be detected because flicker detection is performed based on the video signal supplied through the second vertical scanning circuit 125.

Figure 7:
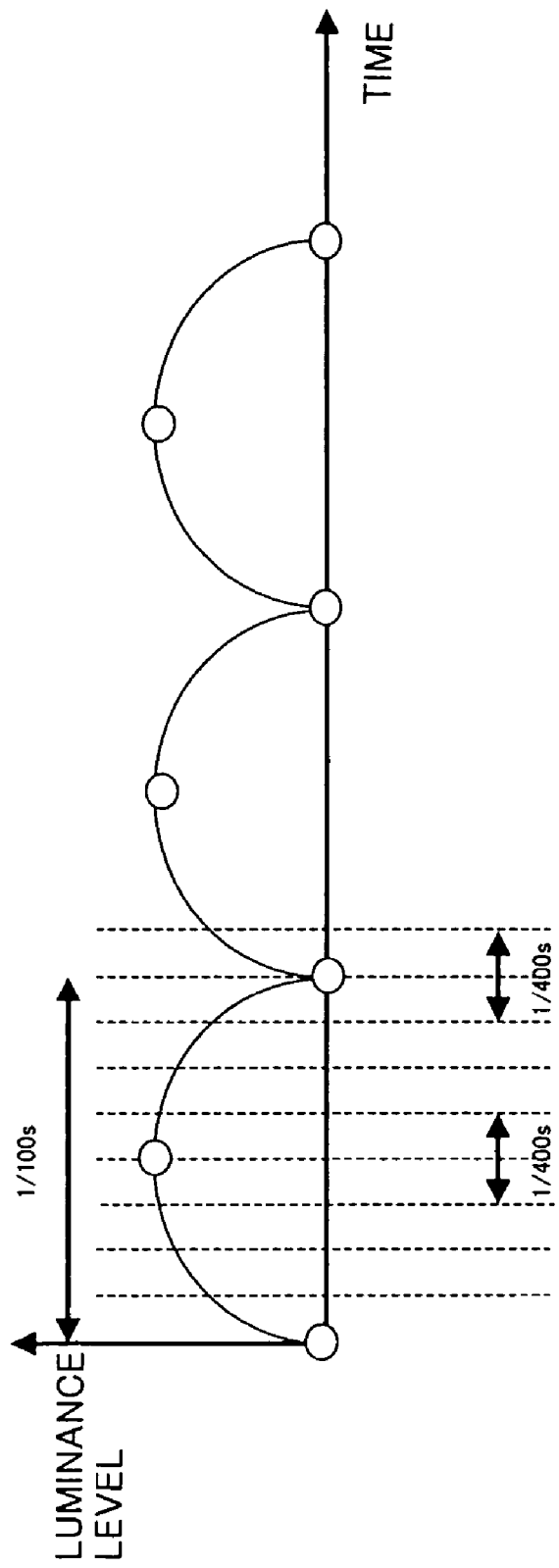
FIG. 7 is a chart for describing a fluctuation cycle of a luminance level of a 50 Hz fluorescent light.

For example, the luminance level of a fluorescent light having a power source frequency of 50 Hz indicates repetitive blinking at the frequency of 100 Hz, as illustrated in FIG. 7. Accordingly, when the exposure period of the pixel circuit is set as $\frac{1}{100}$ s or an integral multiple thereof, the luminance level of the video signal read out at this timing is averaged, and flicker may not be detected. For accurate detection of a flicker in the 50 Hz fluorescent light, exposure must be conducted at the timing (indicated by circles in the figure) when the luminance marks the highest and lowest levels, and the video signals based on such exposure must be sequentially sampled. For example, in order to detect flicker in the 50 Hz fluorescent light, the video signal is sequentially sampled from each pixel circuit connected to the second vertical scanning circuit under the condition of the exposure period of $\frac{1}{400}$ s and the sampling frequency of 200 Hz, and a flicker is detected based on such video signals. For flicker detection in a light source of a high-speed inverter type, such as a light source blinking repeatedly at 100 kHz, the exposure period and the sampling frequency are set at, for example, $\frac{1}{4000000}$ s and 200 kHz, respectively.

When the exposure period and the sampling frequency are set so as to detect flicker in a light source repeatedly blinking at a relatively high speed, such as a light source of a high-speed inverter type, a flicker in a light source, such as a fluorescent light having a power source frequency of 50 Hz or 60 Hz, repeatedly blinking at a lower speed than the light source, such as a fluorescent light of the high-speed inverter type, can also be detected.

Although the amount of the received light may be too small to supply the appropriate video signal when the exposure period for each pixel circuit is shortened as described above, adjustment can be made to increase only the gain for the flicker detection video signal because the gain for the video signal can be individually adjusted in the CMOS image sensor 120 for each pixel circuit.

As described above, by setting the exposure period and the sampling frequency for each pixel circuit connected to the second vertical scanning circuit in accordance with the fluctuation cycle of the luminance level of the light source subjected to flicker detection, flicker in that particular light source can be more accurately detected.

In the above description, the second sampling frequency, i.e. the cycle of the second vertical synchronization signal, is set based on the fluctuation cycle of the luminance level of the light source estimated as the light source illuminating the object, and the cycle has a single fixed value. However, when a plurality of light sources each having a different fluctuation cycle of the luminance level are estimated as the light source, the second vertical synchronization signals having different cycles for different fluctuation cycles may be prearranged, so that the cycles of the second vertical synchronization signals can be sequentially switched to sample the video signal. By thus performing flicker detection based on the video signal obtained through sampling in different cycles, a flicker can be more accurately detected for a plurality of light sources with different fluctuation cycles of the luminance level.

Figure 8:
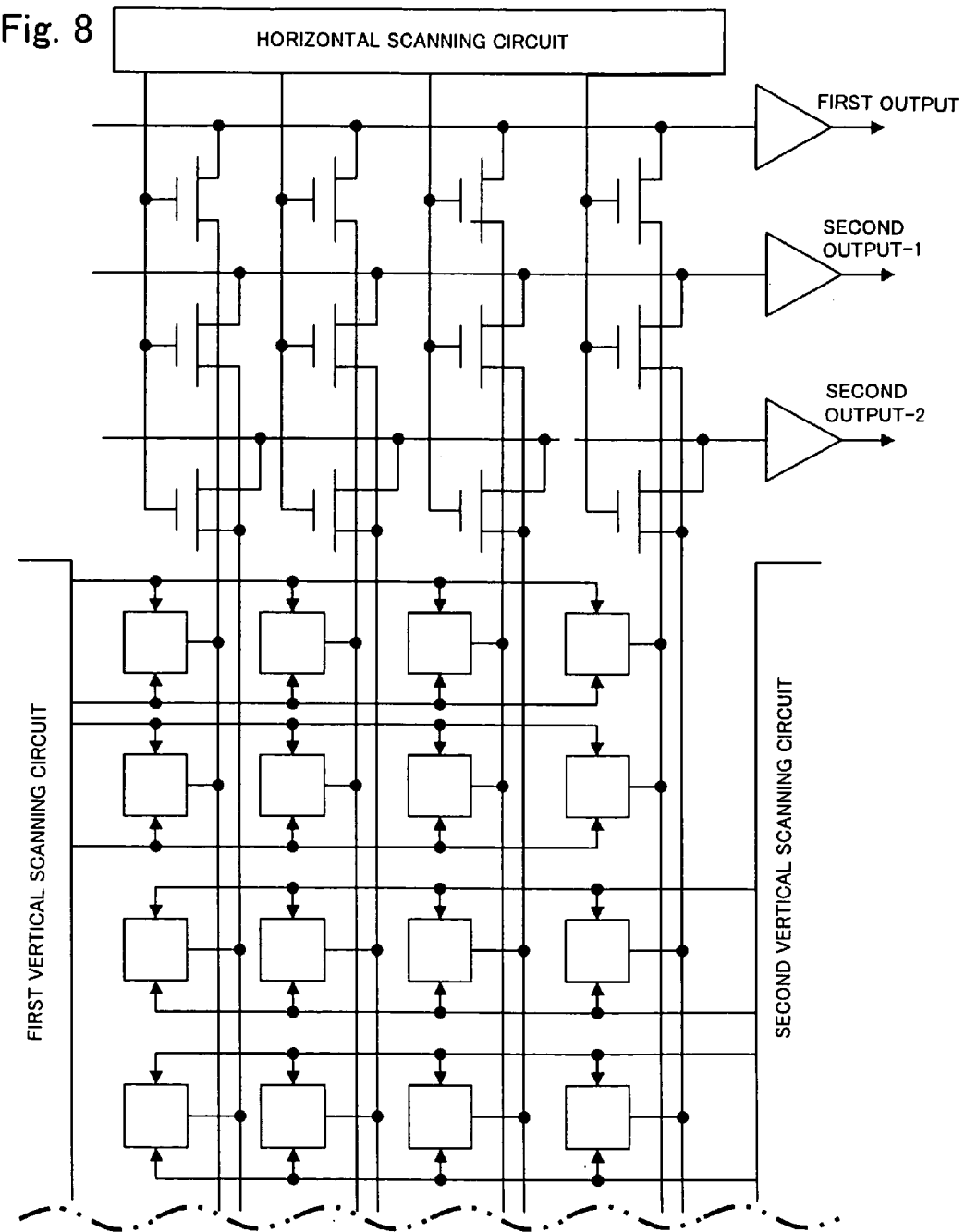
FIG. 8 shows a circuit configuration of the CMOS image sensor having two output terminals for supplying a flicker detection video signal.
Figure 9:
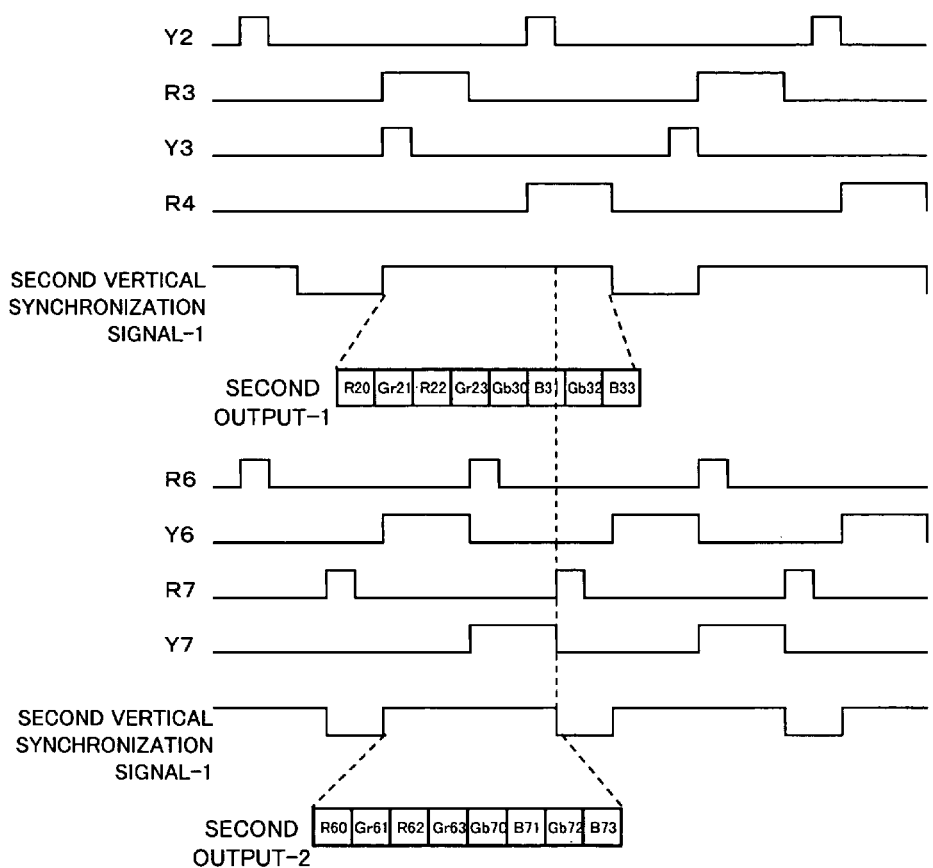
FIG. 9 shows an example of operation timing of a variety of signals supplied to the CMOS image sensor having two output terminals for separately supplying flicker detection video signals sampled at different cycles.

The video signal may be sampled through the second vertical synchronization signal having a different cycle for each pixel column. In such a case, the CMOS image sensor 120 is provided with as many output terminals supplying the flicker detection video signal as there are second vertical synchronization signals with different cycles. For example, when the video signal is supplied from different pixel columns based on two second vertical synchronization signals with different cycles, the CMOS image sensor 120 is provided with a circuit configuration shown in FIG. 8. More specifically, a second output-1 and a second output-2 are provided as the second output terminals for supplying the video signal from the group of pixel circuits connected to the second vertical scanning circuit. The video signal supplied from the group of pixel circuits based on the second vertical synchronization signal having one cycle is output from the second output-1, while the video signal based on the second vertical synchronization signal having the other cycle is output from the second output-2. Such a configuration makes it possible to supply the video signal from different pixel columns based on two second vertical synchronization signals having different cycles. FIG. 9 shows an example of a timing chart of the signals (the reset signal, the selection signal, and the vertical synchronization signal) in which the video signals are supplied from different pixel columns based on the two second vertical synchronization signals with different cycles.

Operation of the CMOS image sensor 120 when a still image is captured will next be described.

Figure 10:
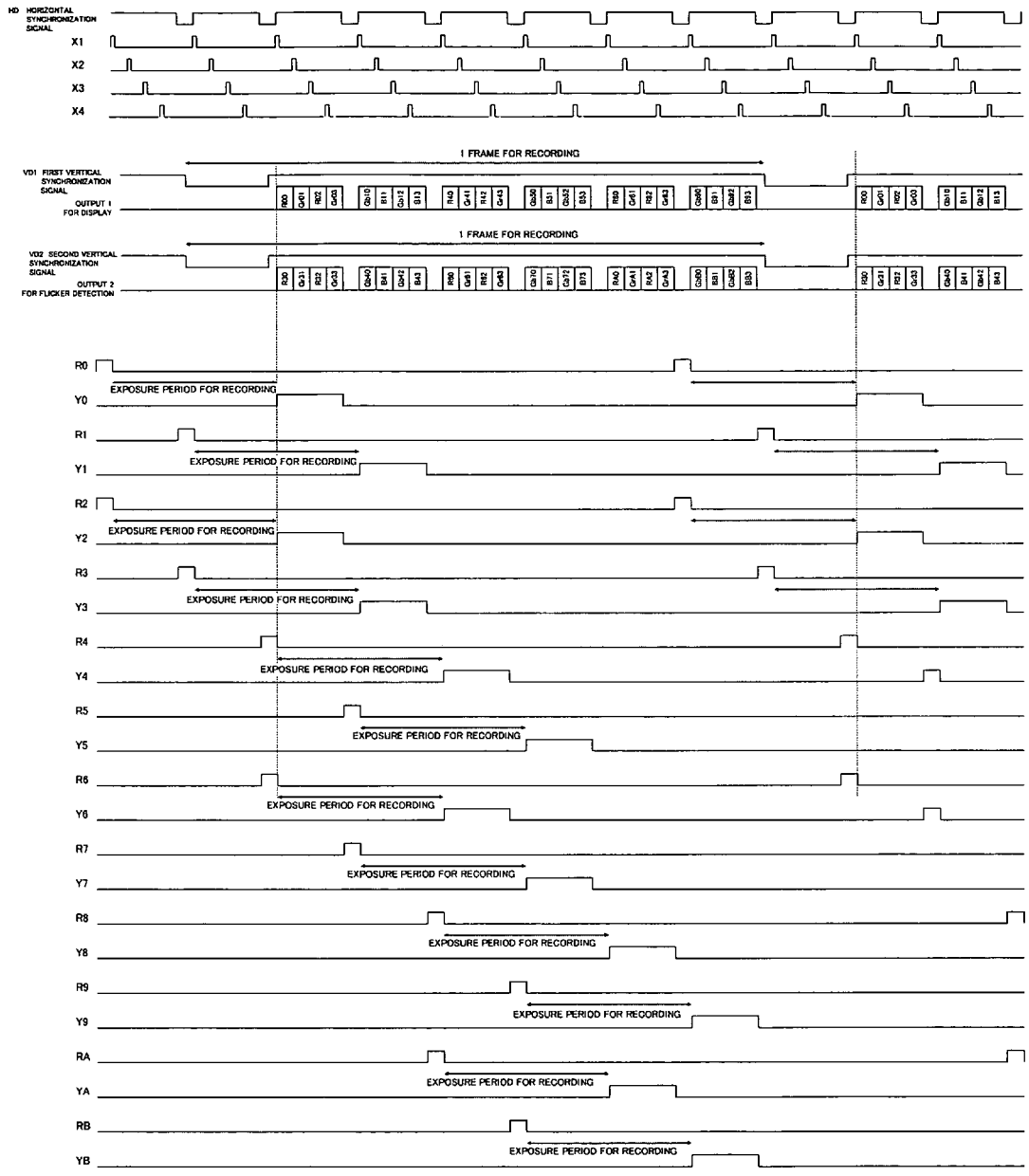
FIG. 10 shows an example of operation timing of a variety of signals supplied to the CMOS image sensor when a still image is taken.

FIG. 10 is a timing chart of signals supplied to each pixel circuit 200 when a still image is captured. The operation differs from that upon display and flicker detection in that each pixel circuit 200 connected to the first and second vertical scanning circuits is operated by a vertical synchronization signal having the same cycle and the same recording exposure period.

By such operation of the CMOS image sensor 120, the recording video signals are output from the first and second output terminals 128 and 129, and each video signal is temporarily held in the first video memory 150 or the second video memory 152 through the AMP 130 and the A/D 140. The recording video signals temporarily held in the first and second video image memories 150 and 152 are sequentially supplied to the image processing circuit 30. The image processing circuit 30 performs predetermined image processing on a group of recording video signals for one frame, and records the processed data in the storage unit 50 as image data.

A method of detecting flicker by the flicker detection circuit 70 will next be described. Flicker detection by the flicker detection circuit can be performed by a general method, as in the following example.

Figure 11:
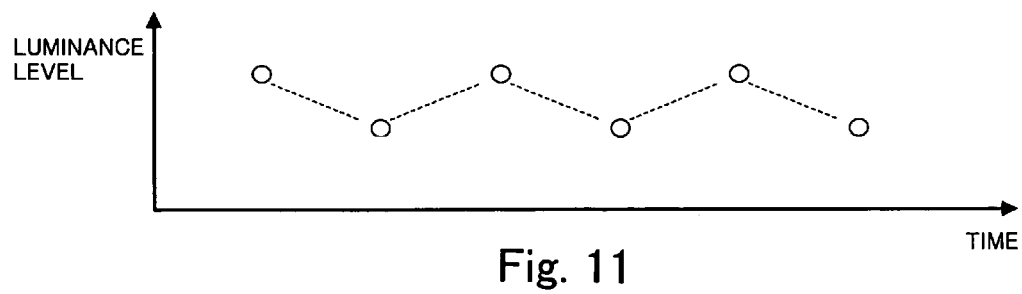
FIG. 11 shows fluctuation of the luminance level when a light source illuminating an object is a repeatedly blinking light source, such as a fluorescent light.

The flicker detection circuit 70 accepts input of the flicker detection video signal temporarily held in the second video memory 152 through the switch 170. When the light source illuminating the object is a repeatedly blinking light source, such as a fluorescent light, the luminance level of the flicker detection video signal fluctuates cyclically, as illustrated in FIG. 11. Therefore, the flicker detection circuit 70 can detect the presence or absence of flicker based on whether or not the luminance level fluctuates cyclically. Whether the luminance level fluctuates cyclically or not can be determined based on, for example, the degree of variation in luminance level of each video signal by referring to history of the luminance level of each input video signal stored for a predetermined period in the flicker detection circuit 70.

The flicker detection circuit 70 can sequentially compare the luminance level of the previously input video signal and that of the newly input video signal, and count the number of video signals whose luminance level differ by a predetermined value, with flicker detection being determined when the count exceeds a predetermined value.

As described above, the flicker detection circuit 70 determines whether or not the light source for the object causes flicker based on the flicker detection video signal temporarily held in the second video memory 152, and supplies the determination result to the CPU 20. The CPU 20 provides the determination result to the image processing circuit 30, which estimates the light source for the object based on the determination result, i.e. the presence or absence of flicker, and performs white balance adjustment in accordance with the estimation result.

Figure 12:
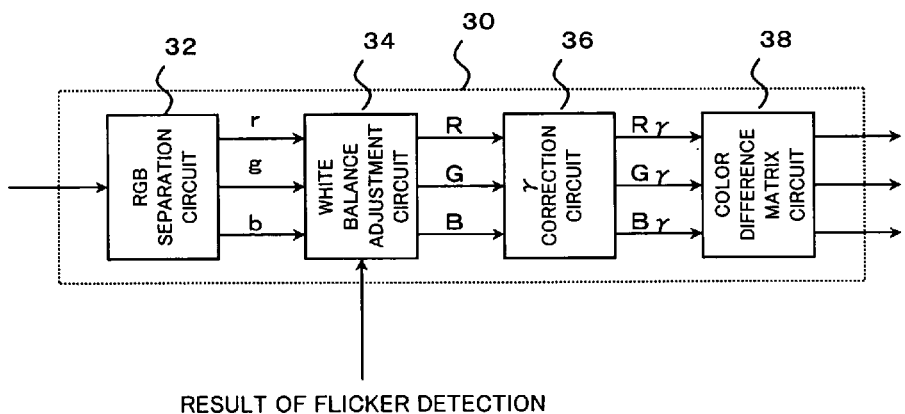
FIG. 12 shows functional blocks of an image processing circuit according to the embodiment of the present invention.

The image processing circuit 30 will next be described in detail. FIG. 12 shows detailed functional blocks of the image processing circuit 30.

An RGB separation circuit 32 separates an input video signal into RGB components to be supplied as color signals. A white balance adjustment circuit 34 estimates a light source of an object based on luminance and color difference of the RGB color signals, and adjusts white balance on the RGB color signals based on the estimation result. The present embodiment is characterized in that the white balance adjustment circuit 34 estimates the light source of the object taking into consideration the flicker detection result provided by the flicker detection circuit 70. A γ correction circuit 36 performs γ correction on the RGB color signals having adjusted white balance, thereby performing tone correction. A color difference matrix circuit 38 performs color difference matrix conversion on the γ-corrected RGB color signals, and supplies a luminance signal (Y) and color difference signals (R-Y, B-Y).

The video signal input to the image processing circuit 30 is subjected to the above-described image processing, thereby causing the processing result to be displayed on the display device 40 as a video image, or to be recorded in the storage unit 50 as image data.

The white balance adjustment circuit 34 will be further described.

Figure 13:
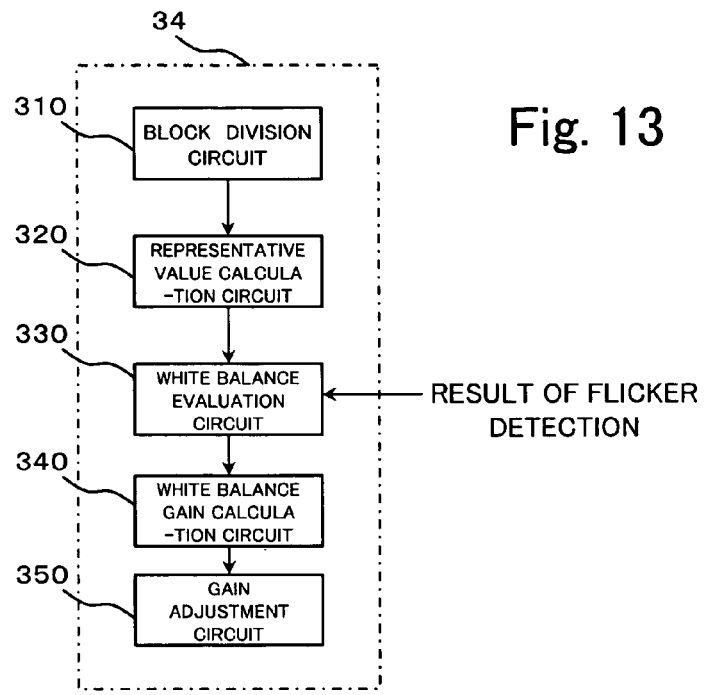
FIG. 13 shows functional blocks of a white balance adjustment circuit according to the embodiment of the present invention.

FIG. 13 shows functional blocks of the white balance adjustment circuit 34. The white balance adjustment circuit described hereinafter is illustrative only, and alternative circuits may also be used as long as they adjust white balance based on the result of estimating the light source illuminating the object. For description purposes, the RGB color signals for one frame will be defined as a single image signal.

A block division circuit 310 obtains a single image signal from the RGB color signals for one frame input from the RGB separation circuit 32, and divides the image signal into a plurality of blocks. Further, a representative value calculation circuit 320 calculates for each block an average of the color signals (R, G, B) in the block, and performs linear transformation on the calculated average based on the following expression (3), thereby obtaining luminance (L) and color difference (u, v) as values representing the block (hereinafter referred to as representative values).

$$\begin{pmatrix} L \\ u \\ v \end{pmatrix} = \begin{pmatrix} 1/4 & 1/2 & 1/4 \\ -1/4 & 1/2 & -1/4 \\ -1/2 & 0 & 1/2 \end{pmatrix} \begin{pmatrix} R \\ G \\ B \end{pmatrix} \quad (3)$$

A white balance evaluation circuit 330 estimates the light source illuminating the object based on the calculated representative value and the like for each block. A white balance gain calculation circuit 340 calculates a gain for white balance adjustment based on the estimation result, and a gain adjustment circuit 350 adjusts white balance of the input RGB color signals based on the gain.

The gain for white balance adjustment is obtained as a value correcting estimated color of light of the light source illuminating the object to gray (achromatic color). Assuming that the estimated color of illumination is denoted as (IL, Iu, Iv), the gain (Rgain, Ggain, Bgain) for white balance adjustment can be derived from the following expressions (4)-(6).

$$\begin{pmatrix} IR \\ IG \\ IB \end{pmatrix} = \begin{pmatrix} 1 & -1 & -1 \\ 1 & 1 & 0 \\ 1 & -1 & 1 \end{pmatrix} \begin{pmatrix} IL \\ Iu \\ Iv \end{pmatrix} \quad (4)$$

$$Imax = \max(IR, IG, IB) \quad (5)$$

$$Rgain = Imax/IR, \; Ggain = Imax/IG, \; Bgain = Imax/IB \quad (6)$$

wherein (IR, IG, IB) is RGB expression of the color of the illumination.

The derived white balance gain (Rgain, Ggain, Bgain) is a value correcting the color appearing when the illumination of this color (i.e. (IR, IG, IB) itself) is reflected by a white object to gray (i.e. R=G=B). The derived white balance gain is input to the gain adjustment circuit 350.

The gain adjustment circuit 350 multiplies the RGB color signals by the gain (Rgain, Ggain, Bgain) calculated by the white balance gain calculation circuit 340, thereby adjusting white balance of the image signal. Therefore, an output (Rout, Gout, Bout) derived by the following equation (7) is supplied from the white balance adjustment circuit 34:

$$Rout=Rgain*R, \; Gout=Ggain*G, \; Bout=Bgain*B \quad (7)$$

A method of estimating a light source illuminating an object in the white balance evaluation circuit 330 will next be described. For simplicity of description, the light source illuminating the object is assumed to be a fluorescent light and daylight.

Figure 14:
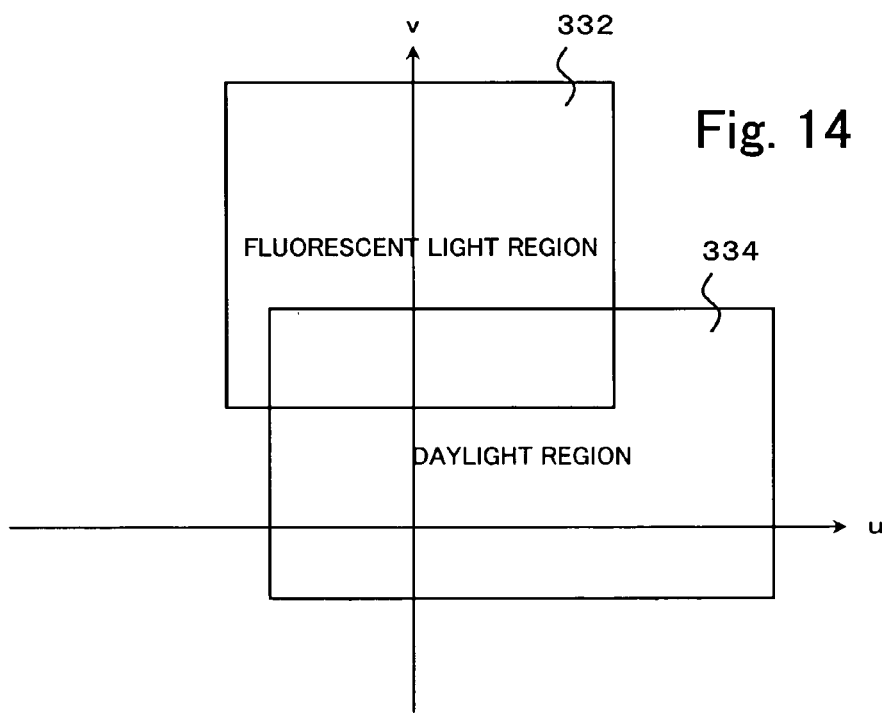
FIG. 14 shows an example of light source regions of a fluorescent light and daylight defined on a color difference plane.

The white balance evaluation circuit 330 checks whether a color difference component of a representative value for each block is included in a fluorescent light region 332 or a daylight region 334 predefined on a color difference plane shown in FIG. 14, thereby estimating the light source for each block. Note that the fluorescent light region 332 is a range of values that can be taken by a color difference component of a white object under fluorescent lighting, and that the daylight region 334 is a range of values that can be taken by a color difference component of a white object under daylight, i.e. solar light. Each region is predefined by experiments and the like.

Figure 15A:
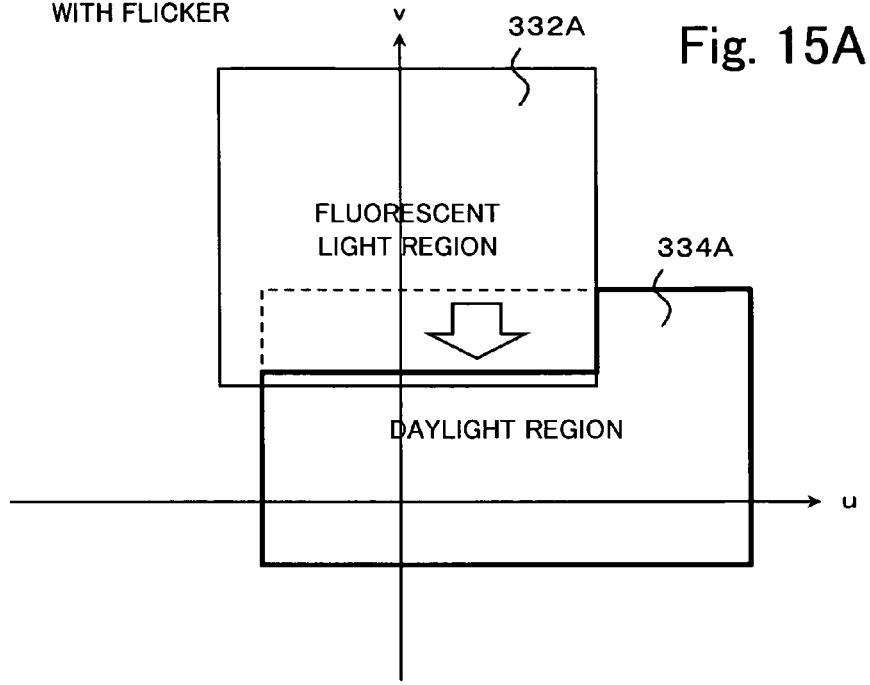
FIG. 15A shows an example of light source regions used by a white balance evaluation circuit to estimate the light source illuminating the object when flicker is present, according to the embodiment of the present invention.
Figure 15B:
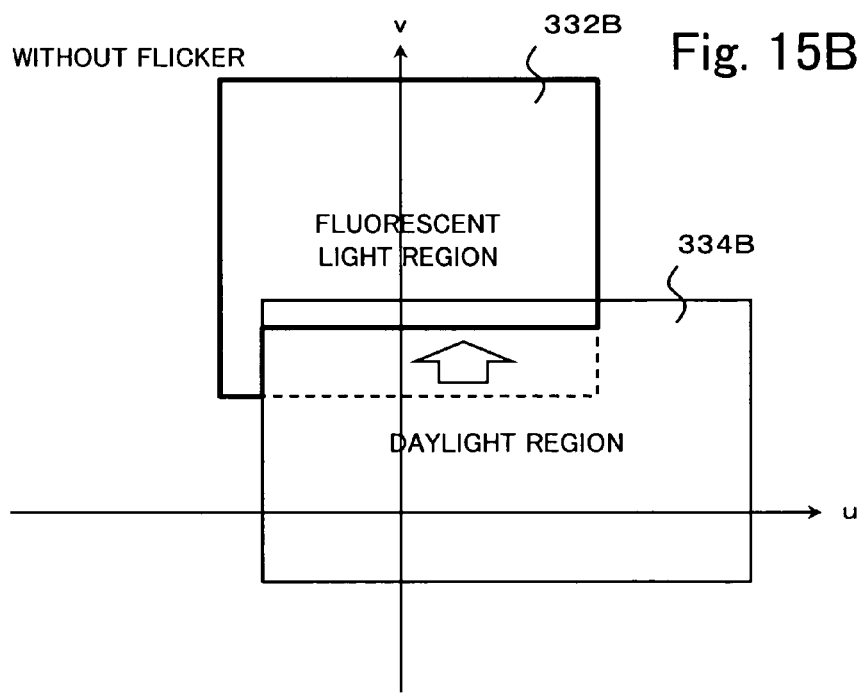
FIG. 15B shows an example of a light source region used by the white balance evaluation circuit to estimate the light source illuminating the object when no flicker is present according to the embodiment of the present invention.

As illustrated in FIG. 14, the color difference component of the white object under fluorescent lighting and that under daylight are close to each other. As a result, the light source estimation using color difference components have often been incorrect, thereby preventing appropriate white balance adjustment. According to the present embodiment, the fluorescent light region 332 and the daylight region 334 defined on the color difference plane are modified in accordance with the flicker detection result. More specifically, the white balance evaluation circuit 330 estimates the light source based on the fluorescent light region and the daylight region each defined separately for the cases with and without flicker. FIG. 15A shows light source regions used when flicker is present, and defined so that a smaller portion of the daylight region overlaps the fluorescent light region. On the other hand, FIG. 15B shows light source regions used when no flicker is present, and defined so that a smaller portion of the fluorescent light region overlaps the daylight region.

Thus, the light source regions on the color difference plane used for light source estimation are changed in accordance with presence or absence of flicker, achieving more appropriate light source estimation. More specifically, when flicker is determined as present by the flicker detection circuit 70, the light source is more likely to be a fluorescent light than daylight. Therefore, the area where the daylight region and the fluorescent light region overlap is shifted toward the fluorescent light region, thereby making it easier for the white balance evaluation circuit 330 to determine the light source of the object as the fluorescent light. On the other hand, when it is determined that no flicker is present by the flicker detection circuit 70, the light source is more likely to be daylight light than a fluorescent light. Therefore, the area where the daylight region and the fluorescent light region overlap is shifted toward the daylight region, thereby making it easier for the white balance evaluation circuit 330 to determine the light source of the object as daylight. Consequently, the white balance evaluation circuit 330 can estimate the light source more appropriately, thereby reducing inappropriate white balance adjustment.

While the light source regions defined on a color difference plane are changed in accordance with a flicker detection result in the above description, the process performed in accordance with the flicker detection result is not limited to changing the light source regions. For example, flicker correction for removing a flicker component included in the video signal can be performed in accordance with the flicker detection result. Alternatively, AE (auto exposure) or AF (auto focus) control can be performed in accordance with the flicker detection result to avoid adverse effects of flicker.

According to the present embodiment, flicker can be accurately detected based on a flicker detection video signal supplied from a group of pixel circuits even while a video image based on a display video signal supplied from the group of pixel circuits is displayed on the display device 40 without providing a dedicated flicker detection device, such as an external sensor for detecting flicker, in a digital camera.

What is claimed is:

1. A digital camera comprising:
an image sensor having an array of pixels for performing photoelectric conversion on received light;
a first scanning circuit that selects a first portion of the array of pixels for output as a first signal used for a purpose other than flicker detection;
a second scanning circuit that selects a second portion of the array of pixels for output as a second signal used alternately for either flicker detection or for still image production, wherein the first and second portion of pixels are interleaved throughout the array of pixels;
a flicker detection circuit that, in a first mode, receives the second signal from the second scanning circuit for detecting flicker of a light source illuminating an object based on the second signal and that outputs a flicker signal; and
an image processor that, in the first mode, receives the flicker signal and the first signal and adjusts the first signal based on the flicker signal for outputting a video signal; wherein, in a second mode, the image processor receives the first signal from the first scanning circuit and the second signal from the second scanning circuit and combines the first and second signals for producing a still image from the combined first and second signals.

2. The digital camera as in claim 1 further comprising a cycle of the second signal that is determined in accordance with a cycle of fluctuation in luminance level of a light source assumed as the light source of the object.

3. The digital camera as in claim 1 further comprising a horizontal scanning circuit for outputting the first signal from first scanning circuit and the second scanning signal from the second scanning circuit on different output terminals.

4. The digital camera as in claim 1, wherein a cycle of the second signal is determined individually for a light source having a different cycle of fluctuation in luminance level.

5. The digital camera as in claim 4, wherein the second scanning circuit controls output of the video signal by successively switching the cycle of the second signal in accordance with a determined cycle.

6. The digital camera according to claim 1 further comprising a display exposure period for the first portion of pixels and a flicker detection exposure period for the second portion of pixels are different from each other, and the flicker detection exposure period is a period determined in accordance with the cycle of fluctuation in luminance level of the light source assumed as the light source of the object.

7. The digital camera according to claim 1 further comprising a display gain for the first portion of pixels and a flicker detection gain for the second portion of pixels are different from each other, and the flicker detection gain exceeds the display gain.

8. The digital camera according to claim 1 further comprising a light source estimation circuit for estimating the light source illuminating the object by checking which of a plurality of light source regions predefined on a color difference plane includes a color difference component of the video signal.

9. The digital camera as in claim 8 further comprising an adjustment circuit for adjusting white balance of each video signal output in accordance with the estimated light source.

10. The digital camera as in claim 9, further comprising a light source estimation circuit that changes a light source region based on a result of flicker detection performed by the flicker detection circuit.

11. The digital camera as in claim 1, wherein the purpose other than flicker detection is a video image display signal.

12. The digital camera as in claim 11, wherein the flicker signal is used for adjusting white balance.

* * * * *